(12) United States Patent
Totale et al.

(10) Patent No.: US 10,007,493 B1
(45) Date of Patent: Jun. 26, 2018

(54) EVENT BASED VALIDATION

(71) Applicant: EMC Corporation, Hopkinton, MA (US)

(72) Inventors: Sachin Gopaldas Totale, Bangalore (IN); Roshan Prakash Salvi, Bangalore (IN); Saravana Kumar Thirumalai Samy, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 32 days.

(21) Appl. No.: 14/585,907

(22) Filed: Dec. 30, 2014

(51) Int. Cl.
*G06F 9/54* (2006.01)
*G06F 8/38* (2018.01)

(52) U.S. Cl.
CPC ............... *G06F 8/38* (2013.01); *G06F 9/542* (2013.01)

(58) Field of Classification Search
CPC ..................... G06F 8/38; G06F 9/54–9/542
USPC .................................................. 717/106–109
See application file for complete search history.

(56) References Cited

U.S. PATENT DOCUMENTS

| | | | | |
|---|---|---|---|---|
| 6,393,458 B1 * | 5/2002 | Gigliotti | ................ | G06F 9/505 707/999.01 |
| 6,654,932 B1 * | 11/2003 | Bahrs | .................... | G06F 8/38 715/210 |
| 6,664,990 B1 * | 12/2003 | Bates | ................ | G06F 3/04812 715/711 |
| 6,718,371 B1 * | 4/2004 | Lowry | ................... | G06F 9/542 709/201 |
| 7,181,490 B1 * | 2/2007 | Harvey | ................... | H04L 67/26 709/203 |
| 7,181,686 B1 * | 2/2007 | Bahrs | ....................... | G06F 8/38 715/210 |
| 7,461,382 B2 * | 12/2008 | Hammerich | ............ | G06F 9/542 707/999.1 |
| 7,788,340 B2 * | 8/2010 | Jolley | ................... | G06F 9/4443 709/203 |
| 8,683,494 B1 * | 3/2014 | Prasad | .................... | G06F 9/542 719/318 |
| 8,781,895 B2 * | 7/2014 | Macartney-Filgate et al. | ........ | G06Q 10/103 705/14.39 |
| 2002/0063734 A1 * | 5/2002 | Khalfay | .................... | G06F 8/30 715/744 |
| 2003/0145124 A1 * | 7/2003 | Guyan | ...................... | G06F 9/46 719/318 |
| 2004/0088184 A1 * | 5/2004 | Nijdam | ................ | G06Q 30/016 706/45 |
| 2004/0243701 A1 * | 12/2004 | Hardwicke | ............ | H04L 29/06 709/224 |
| 2005/0120353 A1 * | 6/2005 | Zhang | .................... | G06Q 10/06 719/310 |

(Continued)

OTHER PUBLICATIONS

EMC, "Getting Started with xCP 2.0: XCP2.0 Self-Paced Tutorial", Dec. 2012 (207 pages).

(Continued)

*Primary Examiner* — Jason D Mitchell
(74) *Attorney, Agent, or Firm* — Chamberlain Hrdlicka

(57) ABSTRACT

Event based validation includes detecting a user interface (UI) event in a page of a web application, and identifying a event subscriber of multiple event subscribers to the UI event. The event subscriber defines a validation condition, which is tested. When the validation condition is satisfied, an action, defined by the event subscriber is performed.

10 Claims, 15 Drawing Sheets

(56) References Cited

U.S. PATENT DOCUMENTS

| | | | | |
|---|---|---|---|---|
| 2005/0177434 | A1* | 8/2005 | Davie | G06Q 20/20 705/16 |
| 2006/0129584 | A1* | 6/2006 | Hoang | G06F 9/542 |
| 2007/0266316 | A1* | 11/2007 | Butlin | G06F 8/38 715/700 |
| 2008/0133812 | A1* | 6/2008 | Kaiser | G06F 9/542 710/263 |
| 2008/0263093 | A1* | 10/2008 | Alcorn | G06F 9/542 |
| 2010/0017812 | A1* | 1/2010 | Nigam | G06F 8/20 719/328 |
| 2011/0010692 | A1* | 1/2011 | Hattori | G06F 8/38 717/132 |
| 2011/0289479 | A1* | 11/2011 | Pletter | G06F 17/30575 717/122 |
| 2012/0124584 | A1* | 5/2012 | Addala | G06F 9/542 718/102 |
| 2012/0179737 | A1* | 7/2012 | Baranov | H04W 76/023 709/201 |
| 2013/0160029 | A1* | 6/2013 | Frome | G06Q 10/02 719/318 |
| 2013/0167110 | A1* | 6/2013 | Gross | G06F 8/38 717/105 |
| 2013/0238384 | A1* | 9/2013 | Caesar | G06F 8/34 705/7.27 |
| 2014/0282218 | A1* | 9/2014 | Kaufman | G06F 17/248 715/781 |
| 2016/0070813 | A1* | 3/2016 | Unter Ecker | G06F 17/30896 715/234 |

OTHER PUBLICATIONS

"EMC Documentum xCP Designer Help Version 2.0 User Guide", EMC Corporation, 2012 (325 pages).

* cited by examiner

EVENT BASED VALIDATION

BACKGROUND

A network is a set of interconnected computing devices that may communicate with each other. Via a network, a user may access a web application. Specifically, a web application is a software application that is developed for the network that may include multiple pages. Users may provide data to a page of the web applications.

BRIEF DESCRIPTION OF DRAWINGS

FIGS. 6-12, 13.1, 13.2, 13.3, and 14 show examples in accordance with one or more embodiments of the technology.

DETAILED DESCRIPTION

Figure 1:
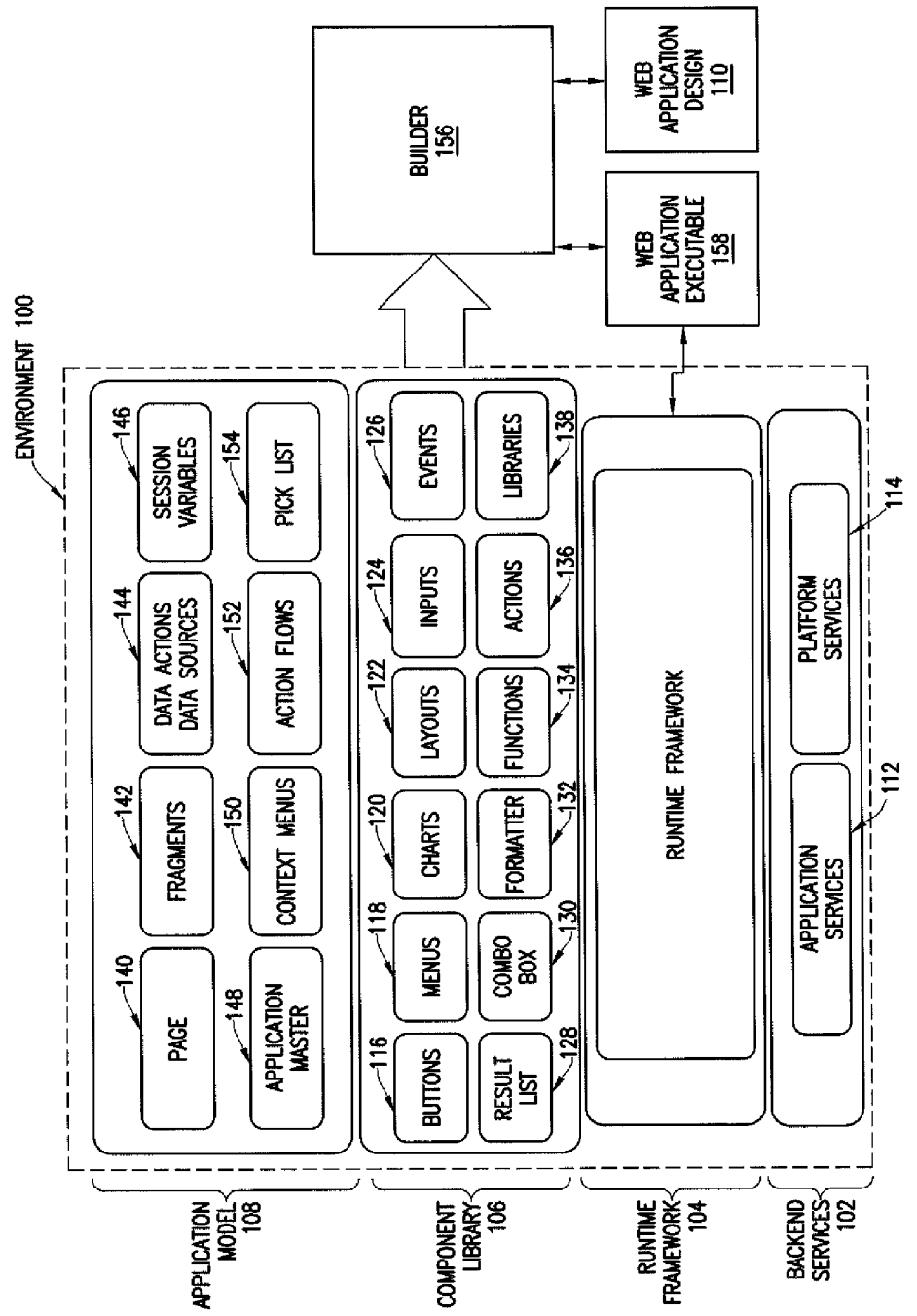
FIGS. 1-3 show example schematic diagrams in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to a publish subscribe model for performing event-based validation in a page of a web application. In particular, during development of a web application, a publishable user interface (UI) event definition is received. Additionally, one or more trigger event definitions are received as extension(s) of the publishable UI event definition. The trigger event definition(s) include one or more event subscribers to the UI event, a validation condition, and a resulting action to perform. Thus, during execution of the web application, a UI event may be detected in a page of the web application. Event subscribers to the UI event are identified, and the validation condition defined by at least one event subscriber is tested. The action defined by the event subscriber is performed when the validation condition is satisfied.

"Web application" is used in the present application to refer generically to the web application executable, the web application design, or another form of the web application. Web applications include pages. A page is a document that is presented in a display to an end user.

As used in the detailed description and claims, a developer is an individual or group of individuals that creates a web application design. An end user is an individual or group of individuals that uses the web application once the web application is developed. Further, an individual or group is deemed to perform an action when an action is performed on behalf of the individual. The entity performing the action may be one or more other individuals, an organization, a device, or a combination thereof.

FIG. 1 shows a schematic diagram of a system in accordance with one or more embodiments of the technology. Specifically, FIG. 1 shows a schematic diagram of an environment (100) for developing a web application design (110) and executing a web application executable (158) created from the a web application design (110) in accordance with one or more embodiments of the technology. As shown in FIG. 1, the environment (100) includes backend services (102), a runtime framework (104), a component library (106), and an application model (108). Each of the aforementioned components is described below.

In one or more embodiments of the technology, backend services (102) are services that are not shown to the developer and ease the development of the web application design (110). The backend services (102) may include application services (112) and platform services (114). In one or more embodiments of the technology, the application services (102) allow a user interface based web application to be built on top of a generic model of a web application.

In one or more embodiments of the technology, the platform services (114) are services that manage the application for multiple different platforms. The multiple different platforms may have heterogeneous operating systems, devices, and/or display device sizes.

In one or more embodiments of the technology, the runtime framework (104) provides a runtime environment for a web application executable (158). Specifically, the runtime framework (104) manages the data and events of the executing web application executable (158). The runtime framework (104) is described in FIG. 2 and below.

In one or more embodiments of the technology, the component library (106) is a library of application components that a developer may add to the web application design (110). In other words, the developer may select components from the component library (106) to add functionality to the web application design (110). The components library (106) may include user interface components and processing components.

In one or more embodiments of the technology, user interface components are components that are displayed to an end user. In other words, instances of the user interface components are displayed on a display device. In one or more embodiments of the technology, the user interface components may include, but are not limited to, buttons (116) (e.g., radio buttons, common button), menus (118) (e.g., drop down menu, check boxes), charts (120), layouts (122), inputs (e.g., fields) (124) and combo boxes (130). User interface components in the component library may each be associated with a set of options. The set of options define the execution of the user interface component. Namely, the set of options define how a particular instance of the component is executed. Options associated with the user interface components may include formatting, any text that is displayed, any action that is to be performed when the user interface component is selected, other options, and/or any combination thereof. The action may be to perform an operation on the page, transition to a specific static page, evaluate an expression to determine the page for transitioning, and/or perform another operation.

In one or more embodiments of the technology, the expression may specify one or more data sources and operations to perform on the data from one or more data sources. A data source is a location of data that is not within the expression. For example, the data source may be another portion of the application page or a data repository. For example, another portion of the application page may be a text field, drop down menu option, or other option. Data from the data source is used to evaluate the operations in the expression. For example, the operation may include a conditional statement based on the data obtained. By way of another example, the operation may be to perform an end user submitted action specified in another field of the page. The result of evaluating the expression is the target page that is selected.

In one or more embodiments of the technology, the processing components are components that are hidden to the end user (i.e., are not displayed to the end user). For example, the processing components may include events (126), result lists (128), formatter (132), functions (134), actions (136), and libraries (138). Each of the processing components is discussed below.

An event (126) is a collection of components that define an occurrence of an action in a page of the web application and a corresponding reaction to the occurrence. The event may be triggered by an end user or software, such as the web application. The components of the event (126) are described below with reference to FIG. 2.

Formatter (132) is instructions, which enables arranging of the data in specific formats in accordance with one or more embodiments of the technology. A formatter may be application to number, date time values, other values, or a combination thereof. In accordance with one or more embodiments of the technology, functions (134) are the re-usable piece of code, which take a set of inputs and return an output. Examples of functions include concat, substring, min, max, and other functions.

In accordance with one or more embodiments of the technology, an action (136) is a piece of reusable executable functionality that can be abstracted out of any particular component so that the action may be usefully shared among multiple pages and/or context menus. Example actions include update, delete, create, check-in, checkout, download, and other actions.

In accordance with one or more embodiments of the technology, a library is a group of files, which constitute utility, and infrastructure code. Example libraries include application startup code, action manager, type manager, utility, and logger. The processing components may also each be associated with a set of options that define how the processing components are used.

In one or more embodiments of the technology, an application model (108) is a generic model for any web application. The application model includes pages (140), fragments (142), data actions and data sources (144), session variables (146), application master (148), context menus (150), action flows (152), and a pick list (154). Each of these components of the application model is described below.

A page (140) in the application model (108) is a template for a web page. In other words, a page in the application model (108) is a template for a complete and individual document that is displayable to the end user. A fragment (142) represents at least a portion of an activity. In other words, an activity is a defined sequence of actions that an end user may perform using the web application. A fragment is a portion of the defined sequence of actions. Data actions and data sources (144) define the storage structure and storage location of the data and the actions to perform on the data.

Session variables (146) are the variables stored for a particular session between the end user and the web application executable (158). For example, session variables (146) may include connection variables and information about the end user, such as the user's credentials (e.g., user identifier), role of the end user, and other information.

The application master (148) defines the global look and feel of the web application in accordance with one or more embodiments of the technology. For example, the application master (148) may include various banners, menu items, fonts, colors, and other features that are displayed and that surround the individual pages. By way of another example, the application master (148) may include a template on which the pages (140) are based.

Context menus (150) are instances of menus that are dependent on the context in which the menu is selected. For example, the context may be a particular user interface component that is selected, the page that is displayed, or another context. The context menu presents options that are specific to the particular context. The manner of selecting the context menu is not dependent on the context. Specifically, an end user may select the context menu in the same way and have different menu options presented based on the context.

Action flows (152) are a sequence of actions that are performed. Action flows may or may not have user interaction. For example, an action flow may be completely automatic. By way of another example, an action flow may be a defined sequence of actions by which a user is guided using the web application.

In one or more embodiments of the technology, a pick list (154) is a list of displayed items from which a set of items may be selected. In other words, more than one displayed item may be selected from a pick list.

The web application design (110) is a particular design of a web application created by a developer. Specifically, the web application design (110) includes instances of the components of the application model (108) and component library (106), which may execute on the runtime environment (104) and use the backend services (102).

The web application design (110) is connected to a builder (156) in accordance with one or more embodiments of the technology. The builder (156) provides a user interface for a developer to create the web application design (110). In some embodiments, the developer does not need to know programming languages or other development knowledge to build the web application design. Rather, the builder (156) provides an interface by which the developer can primarily drag and drop components into a web application design (110), and enter parameters into fields to create the web application design (110). Thus, in some embodiments, a developer may be a business analyst rather than have any training in application development using a programming language.

The user interface of the builder (156) may include editor features and sub-systems. The editor features may include editors for modifying various aspects or views of the web application design, a builder user interface to assist in the development of the web application design in accordance with one or more embodiments of the technology. For example, the editors may include business objects, document, case, search, reports, pages, roles, app, widgets, and process editors. The builder user interface may include a new artifact wizard, add-on top-level menu, add-on tool bar buttons, context menus, artifacts properties page, and a model editor.

The business object editor includes functionality to create business objects. A business object is a software representation of a particular entity that is tracked by the web application. For example, a business object may be employee, company, customer, vendor, and other such entities. In one or more embodiments of the technology, business objects may have defined attributes. The attributes of the business object are discrete items of information for the business object. For example, an employee business object may have a name, address, social security number, and other such attributes. The business object editor includes functionality to assist a developer in creating a new business object and defining a label and data type for each attribute of the business object. The business object editor may further assist the developer to create pages for manipulating the business object. Thus, during runtime, an end user may create particular instances of a business object and provide attribute values for the business object as well as view the business object. For example, for a customer, a developer may create the customer business object with attributes String name, Boolean male or female, Date birthday, and String email address. During runtime, an end user may create an instance of the customer business object with values Mary, female, 16 Dec. 1956, and mary@marysdomain.com.

The builder (156) also includes functionality to create the web application executable (158) from the web application design (110). In other words, the builder constructs the instructions for the web application executable from the web application design that is created using a drag and drop framework in accordance with one or more embodiments of the technology. The builder (156) may include components and functionality to perform artifact management, validate the web application, generate code, package, and deploy the web application. The builder (156) may also include components and functionality to perform source control and project/library management.

While FIG. 1 shows a configuration of components, other configurations may be used without departing from the scope of the technology. For example, various components may be combined to create a single component. As another example, the functionality performed by a single component may be performed by two or more components.

Figure 2:
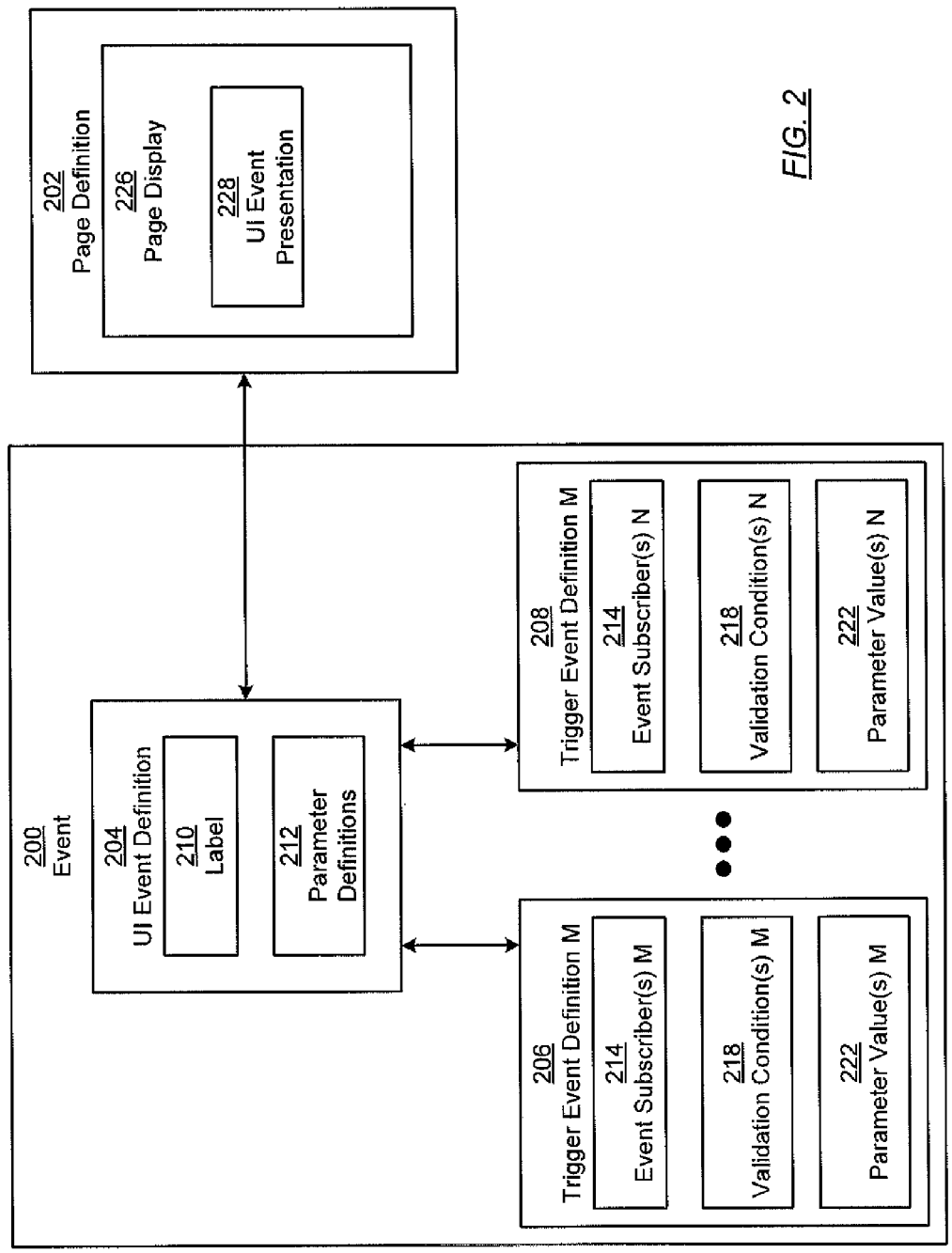

FIG. 2 shows a schematic diagram of an event (200) and a page definition (202) in accordance with one or more embodiments of the technology. As shown in FIG. 2, the event (200) includes a UI event definition (204) and one or more trigger event definitions (e.g., trigger event definition m (206), trigger event definition (208)). Both of these components are described below.

A UI event definition (204) is a general definition of a UI event in accordance with one or more embodiments of the technology. In particular, the UI event definition (204) may be an abstract definition of a UI event that is extended by particular trigger event definitions discussed below. The UI event definition (204) may include a label (210) uniquely naming the UI event and one or more parameter(s) definition. A parameter definition specifies the set of one or more parameters to be defined in any trigger event definition that extends the UI event definition. Specifically, the parameter definition may include name, data type and size of a parameter value defined in the trigger event definition (e.g., trigger event definition M (206), trigger event definition N (208)).

In one or more embodiments of the technology, the UI event definition (204) describes a publishable event.

In one or more embodiments of the technology, trigger event definition (e.g., trigger event definition M (206), trigger event definition N (208)) is an extension of the UI event definition (204). In other words, the trigger event definition provides particular values for the UI event definition (204). The trigger event definitions may reference the label (210) of the UI event definition (204) to indicate that the trigger event definition is an extension of the UI event definition (204).

In one or more embodiments of the technology, the trigger event definition relates event subscribers (e.g., event subscriber m (214), event subscriber n (216)) to a validation condition (e.g., validation condition m (218), validation condition n (220)) and one or more corresponding parameter values (e.g., parameter value(s) m (222), parameter value(s) n (224)). The event subscribers (e.g., event subscriber m (214), event subscriber n (216)) are subscribers to UI events in the page. In particular, the event subscribers (e.g., event subscriber m (214), event subscriber n (216)) may be particular actions in the page. In other words, each event subscriber defines a triggering event in a corresponding portion of the page in accordance with one or more embodiments of the technology. The corresponding portion may be the same or different for different event subscribers in the same trigger event definition. For example, an event subscriber may be to focus, change, delete, or other action of an attribute value in a create or modify instance of business object page. By way of another example, the event subscriber may be that particular optional text is displayed on the page or another action performed by the software application.

A validation condition (e.g., validation condition m (218), validation condition n (220)) defines a test to perform on one or more data items to validate the data items. For example, the condition may test whether a particular portion of the page is blank or has an erroneous data type, whether two portions of the page match, whether data submitted in a portion of the matches stored data or data obtained from an external source, whether required information is submitted. In one or more embodiments of the technology, multiple validation conditions may be defined for a single trigger event definition. Further, in one or more embodiments of the technology, each event subscriber defined in the same trigger event definition shares the same set of validation conditions in accordance with one or more embodiments of the technology. In one or more embodiments of the technology, the validation conditions may be defined using expressions.

In one or more embodiments of the technology, parameter values (e.g., parameter value(s) m (222), parameter value(s) n (224)) are the defined values for the parameter definitions. In one or more embodiments of the technology, the parameter value(s) may specify a resulting action to perform if the validation condition(s) is/are satisfied. For example, if a parameter definition is a message, the parameter value may be the particular message as the resulting action. By way of another example, if the parameter definitions include a message and an email address, one parameter value may be the particular message and the other parameter value may be the email address or a reference to a storage location of the email address.

In some embodiments, trigger event definitions may be linked by an event subscriber. For example, a resulting action defined as a parameter in a first trigger event definition, may be defined as an event subscriber in a second trigger event definition. In the example, the performance of the resulting action is published as an event and causes the next trigger event definition to be performed.

As shown in FIG. 2, a page definition may include a page display (226). The page display (226) corresponds to the various graphical user interface components, such as images, text, input fields, etc., that are displayed on the page. In some embodiments, a developer may add a UI event presentation (228) to the page display (226). The UI event presentation (228) is any feedback for the UI event as defined by the corresponding trigger event definition. For example, the UI event presentation (228) may be a message, a popup box, a graphical status indicator, or other presentation of information. In some embodiments, the UI event presentation is linked to the UI event definition (204). In other words, the linking may be using label (210) as a reference to the UI event definition. The UI event presentation may also specify how to present parameter values (e.g., parameter value(s) m (222), parameter value(s) n (224)) using the parameter definitions (212).

For example, consider the scenario in which a parameter definition is an "image". In other words, the parameter definition does not specify the particular image, but rather defines that any extension of the UI event definition includes an image. In the example, each trigger event definition includes a corresponding particular image. The UI event presentation references the label and specifies to display an image by referencing parameter definition image associated with the label. When a UI event is triggered, any matching event subscriber and verification conditions are identified, and the corresponding particular image is obtained and displayed in the UI event presentation. Thus, the UI event presentation may be populated by any of the multiple trigger event definitions through reference to the UI event definition.

Figure 3:
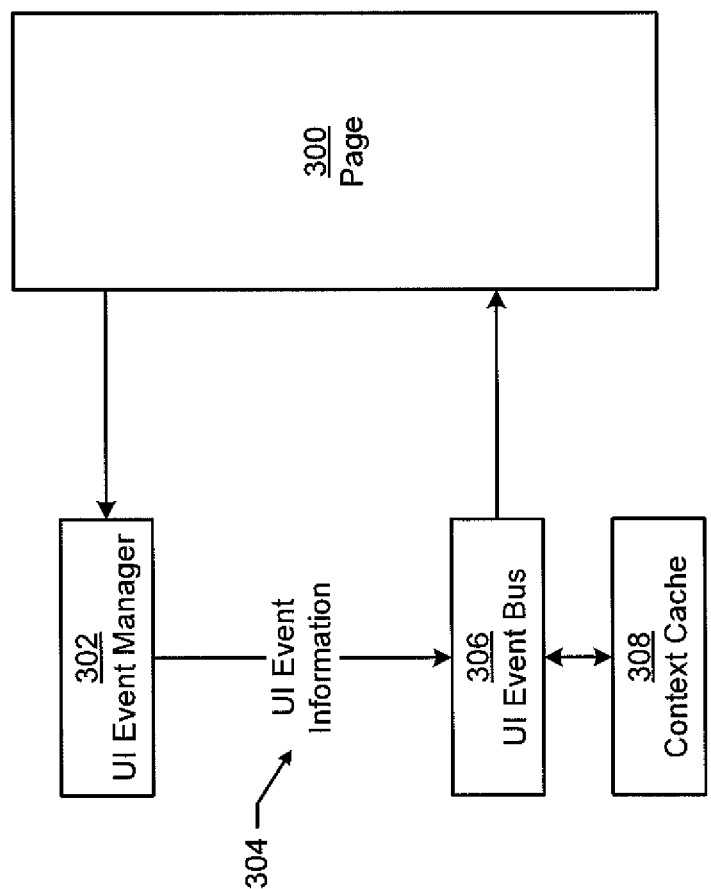

FIG. 3 shows a schematic diagram of a runtime environment in accordance with one or more embodiments of the technology. Specifically, FIG. 3 shows a schematic of the environment used to perform event-based validation while the web application is being used by an end user. Page (300) is a page of the web application as described above. The page (300) is connected to an event manager (302). The UI event manager (302) includes functionality to detect UI events in the page. Specifically, the event manager is configured to detect when an end user enters information, selects a text box or button, or performs any other action in the page. The event manager (302) includes functionality to publish UI event information (304) to an event bus (306).

The event information (304) may specify, explicitly or implicitly, only that a UI event occurred in accordance with one or more embodiments of the technology. In other embodiments, the event information (304) may include additional information, such as the type of UI event, location of the UI event, data entered by a user, other information, or any combination thereof.

The event bus (306) is operatively connected to the UI event manager (302) in accordance with one or more embodiments of the technology. The event bus (306) includes functionality to receive the published UI events. Event subscribers (not shown in FIG. 3) obtain the UI event information from the event bus (306) and process the UI event information.

A context cache may be connected to the event bus (306). The context cache (308) includes functionality to store context information, such as data submitted by the user in the page and in another page, log in information of the user, and other context information. The context information may be used by the event subscribers to process the validation conditions.

Figure 4:
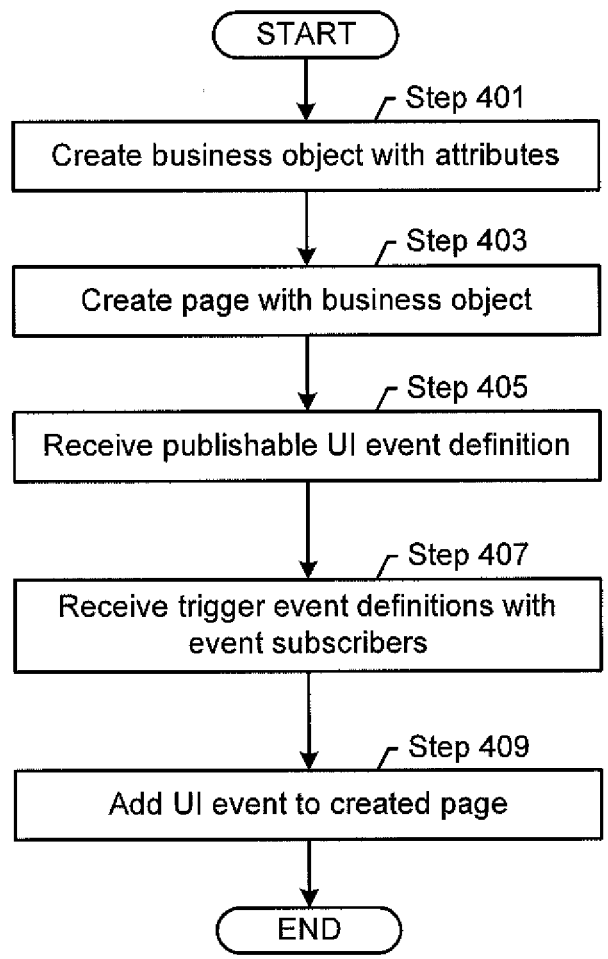
FIGS. 4 and 5 show example flowcharts in accordance with one or more embodiments of the technology.
Figure 5:
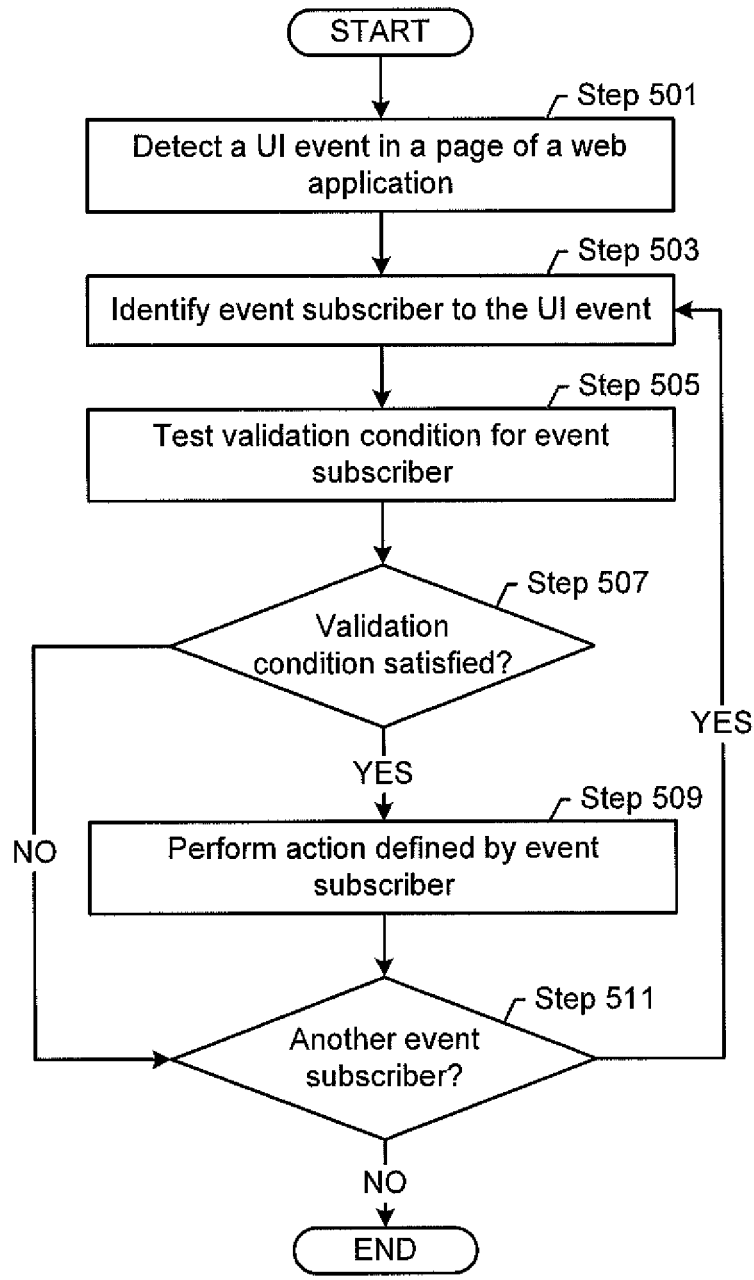

FIGS. 4 and 5 show flowcharts in accordance with one or more embodiments of the technology. In particular, FIG. 4 may be performed using and/or by the development environment shown in FIGS. 1 and 2. FIG. 5 may be performed using and/or by the runtime environment shown in FIG. 3. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

In Step 401, a business object with attributes is created in accordance with one or more embodiments of the technology. For example, the developer may create a business object in the business object editor. The developer may add a label naming the business object. Further, the developer may add attributes. Adding attributes may be performed by selecting an add attribute button, dragging and dropping attributes having a data type from a template set of data types to a business object interface for creating and/or editing the business object, or performing other actions or any combination thereof. The developer may further use the business object editor to submit parameters for the attributes, such as labels, lengths, etc. Thus, the development environment receives a business object with attributes.

In Step 403, a page with the business object is created in accordance with one or more embodiments of the technology. Creating a page may be performed by selecting a create page button and adding various components to the page. In one or more embodiments of the technology, the create page button may be associated with the business object and may be based on a predefined template for business objects. For example, the predefined template may be defined to edit, create new, view, or perform other actions on one or more instance of the business object. A developer may edit the page using the page editor interface. Thus, the page is received.

In Step 405, a publishable UI event definition is received in accordance with one or more embodiments of the technology. In one or more embodiments of the technology, the developer may select to create a new publishable UI event using the component library. Further, the developer may add one or more parameter definitions to the publishable event using the various editors and component library. Thus, the development environment receives the publishable UI event definition.

In Step 407, trigger event definitions with event subscribers are received in accordance with one or more embodiments of the technology. In one or more embodiments of the technology, the development environment guides the developer to create trigger event definitions. In particular, the development environment may request the developer to select the publishable UI event definition being extended by the trigger event definition. The development environment may also guide the user to select the various event subscribers by specifying actions on attributes of the business object or any other UI action. In one or more embodiments of the technology, the development environment may further guide the developer to create validation conditions using expressions and submitting parameter values for each parameter definition.

In Step 409, a UI event is added to the created page in accordance with one or more embodiments of the technology. In particular, the developer may link the page created in Step 403 with the publishable UI event definition created in Step 405. For example, the developer may specify a location on the page to display the UI event presentation.

Although not shown in FIG. 4, the developer may continue to develop the web application. The web application may be saved into storage. Further, the web application may be built to create an executable web application. When the executable web application is created, end users may use the web application to perform one or more actions.

FIG. 5 shows a flowchart for the runtime environment to process UI events in accordance with one or more embodiments of the technology. In Step 501, a UI event is detected in a page of a web application in accordance with one or more embodiments of the technology. In one or more embodiments of the technology, the event manager detects that an end user or application performed an action in the UI of the web application. In response, the event manager publishes the UI event.

In Step 503, an event subscriber to the UI event is identified in accordance with one or more embodiments of the technology. In one or more embodiments of the technology, the event subscriber is identified based on the type of UI event. The type is the action and item (e.g., attribute, text, component, etc.) being affected by the action. For example, if the UI event is that a user changed a certain attribute value, then any subscriber referencing a change to the attribute value is identified. Various techniques may be used to identify the event subscriber to the published UI event.

In Step 505, a validation condition for the event subscriber is tested in accordance with one or more embodiments of the technology. In one or more embodiments of the technology, the validation condition is obtained from the code of the event subscriber and executed. Testing the validation condition may include obtaining data from the context cache and/or from the page. In some embodiments, the obtained data that is tested may be from a different portion of the page than the UI event and/or from an external source. Thus, obtaining the data may be performed by accessing the different portions of the page or the external source.

In Step 507, a determination is made whether the validation condition is satisfied in accordance with one or more embodiments of the technology. The result of testing the validation condition may be true or false in accordance with one or more embodiments of the technology. The validation condition is satisfied if the result of executing the validation condition is true. For example, a test of "name=10 characters in length" is satisfied if the name is equal to ten characters in length and not satisfied if the name is greater than or less than ten characters in length.

If the validation condition is satisfied, then the action defined by the event subscriber is performed in Step 509 in accordance with one or more embodiments of the technology. In one or more embodiments of the technology, the action is defined in the page. Specifically, the page references the UI event definition and the parameter definition. Thus, performing the action may be performed by using the parameter values in the satisfied validation condition to perform the action specified by the page. Other techniques for performing the action may be used without departing from the scope of the technology.

Regardless of whether the validation condition is satisfied, a determination may be made as to whether another event subscriber exists in Step 511. If another event subscriber exists, then the flow may repeat with Step 503. Although FIG. 5 shows a flowchart of serially processing event subscribers, the Steps of FIG. 5 may be performed in parallel for multiple event subscribers to the UI event in accordance with one or more embodiments of the technology.

Further, although not shown in FIG. 5, the performance of the action may be another UI event that may have event subscribers. In such a scenario, FIG. 5 may repeat with the detection of the UI event being the performance of the action in Step 509. Thus, a chain of validation may be performed whereby satisfaction of a previous validation condition and performance of the action may trigger a subsequent testing of a validation condition in a subsequent event subscriber to the action.

The following examples are for explanatory purposes only and not intended to limit the scope of the technology. FIGS. 6-12, 13.1, 13.2, and 13.3 show an example of a development of a web application with event based validation and a corresponding execution of the web application in accordance with one or more embodiments of the technology. FIGS. 6-12, 13.1, 13.2, and 13.3 may correspond to the interface of the development environment shown in FIGS. 1 and 2.

Figure 6:
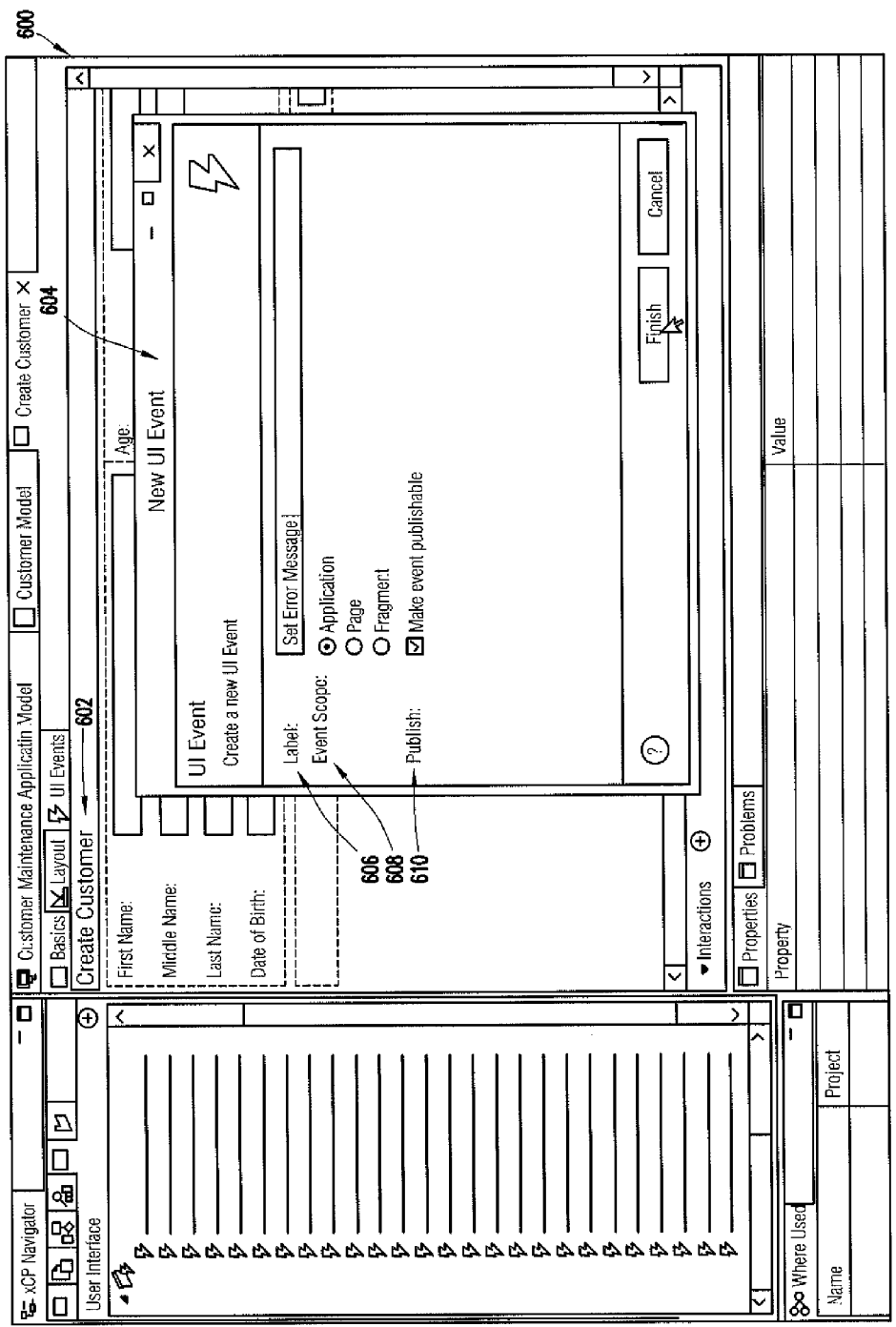

FIG. 6 shows an example user interface (600) of a development environment in accordance with one or more embodiments of the technology. In the example shown in FIG. 6, the developer has created a new business object "customer" and created a create page (602) to create instances of the customer during runtime. The create page (602) is shown in the development environment as the developer may continue to edit the look and feel of the create page (602).

The developer has also selected to create a new UI event definition. In response, the new UI event definition dialog box (604) is displayed to the developer. The developer may create a label (606) naming the UI event definition, may define the event scope (608) of the UI event definition, and may select whether to make the event publishable (610). The event scope defines where the UI event is valid and may be triggered. For example, the event scope may be the entire web application, only the page, or only the fragment of the page. Outside of the scope, the UI event is not defined. In FIG. 6, the developer selects the event scope as the page. Further, the developer selects to publish the event, thereby allowing event subscribers to subscribe to the event.

Figure 7:
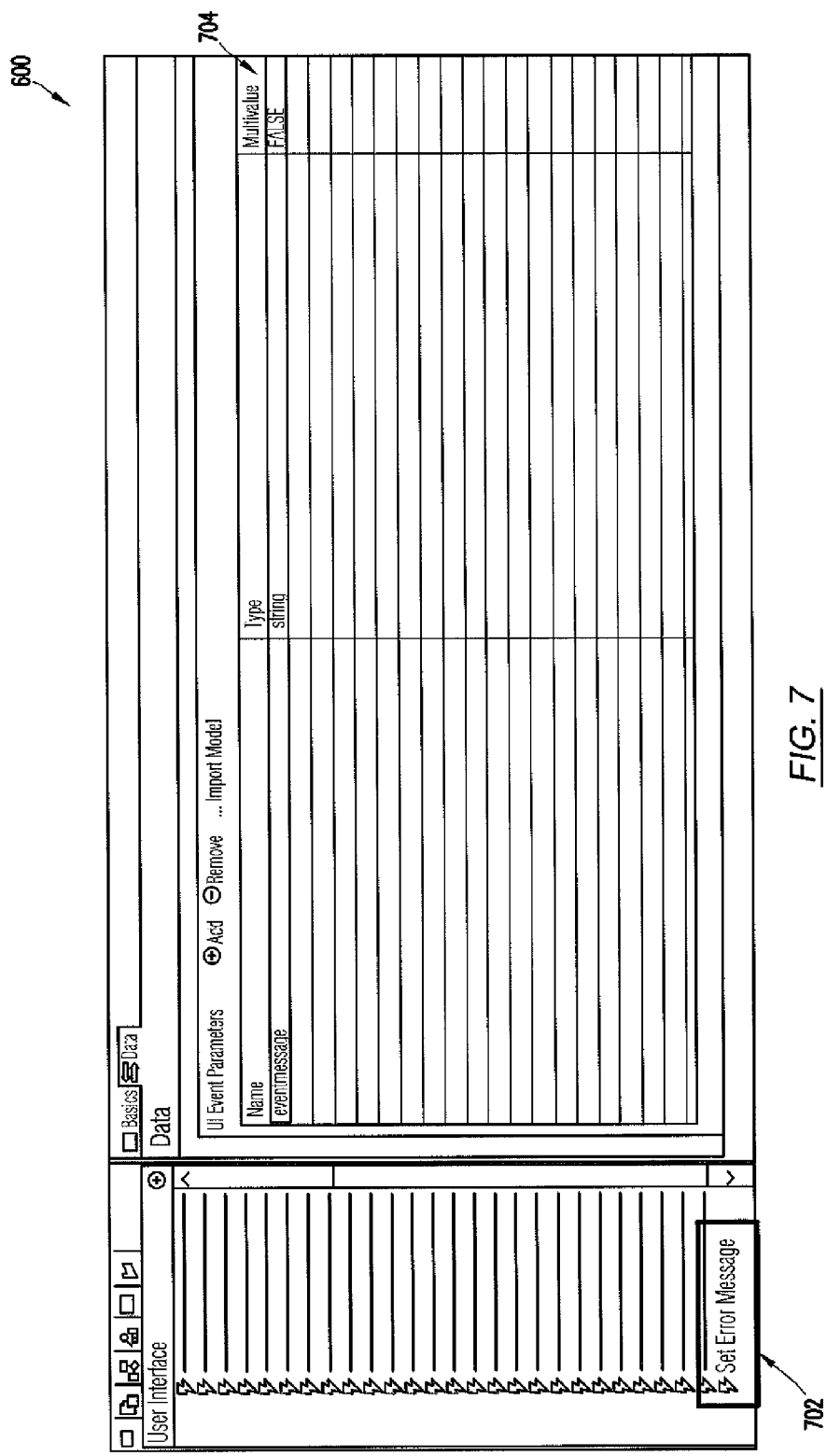

Continuing with the example, FIG. 7 shows the example user interface (600) when the developer selects to create the event in FIG. 6. As shown, the developer may define, for the "set error message" event definition (702), parameter definition (704). The parameter definition has a name "event message" and has a string data type. Thus, trigger event definitions that extend the set error message event definition may define a specific event message.

Figure 8:
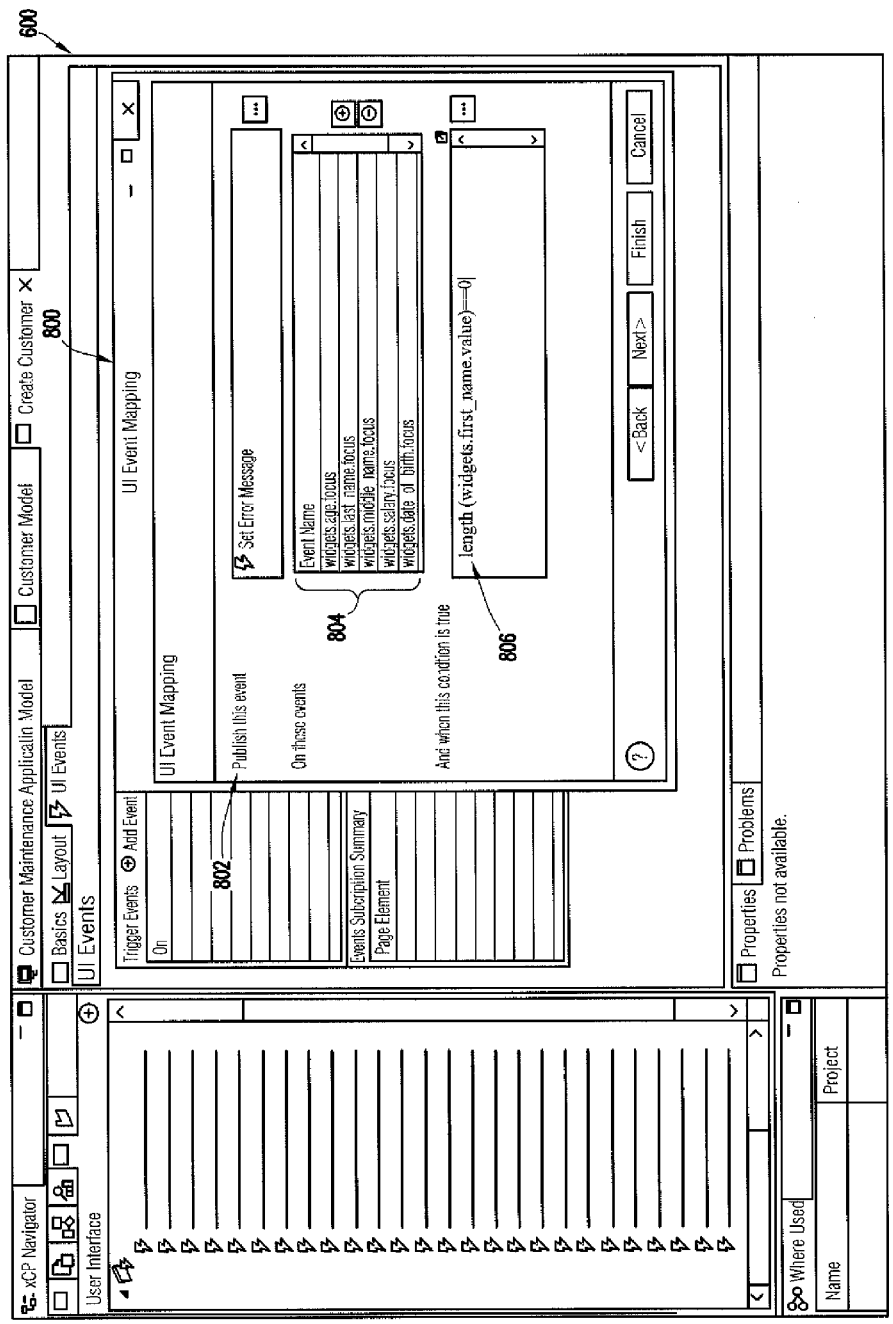

Continuing with the example, FIG. 8 shows the user interface (600) when the developer creates a trigger event definition. Specifically, FIG. 8 shows a dialog box (800) for creating a trigger event definition. As shown in FIG. 8, the trigger event definition created by the developer references the event definition (802) created by the developer in FIG. 6 using the label defined in FIG. 6. Further, as shown in FIG. 8, the trigger event definition includes multiple event subscribers (804). In the example, each event subscriber is to "focus" on a particular attribute of the customer business object. In other words, when an end user selects a particular text box to edit an attribute, the end user focuses on the attribute. As defined in FIG. 8, the event subscribers include focusing on the age attribute, focusing on the last name attribute, focusing on the middle name attribute, amongst others.

Additionally, the developer may define a validation condition (806) to test when any of the event subscribers are triggered. In FIG. 8, the validation condition (806) is to test whether the length of the first name is empty. If the length of the first name is empty, then the validation condition is satisfied.

Figure 9:
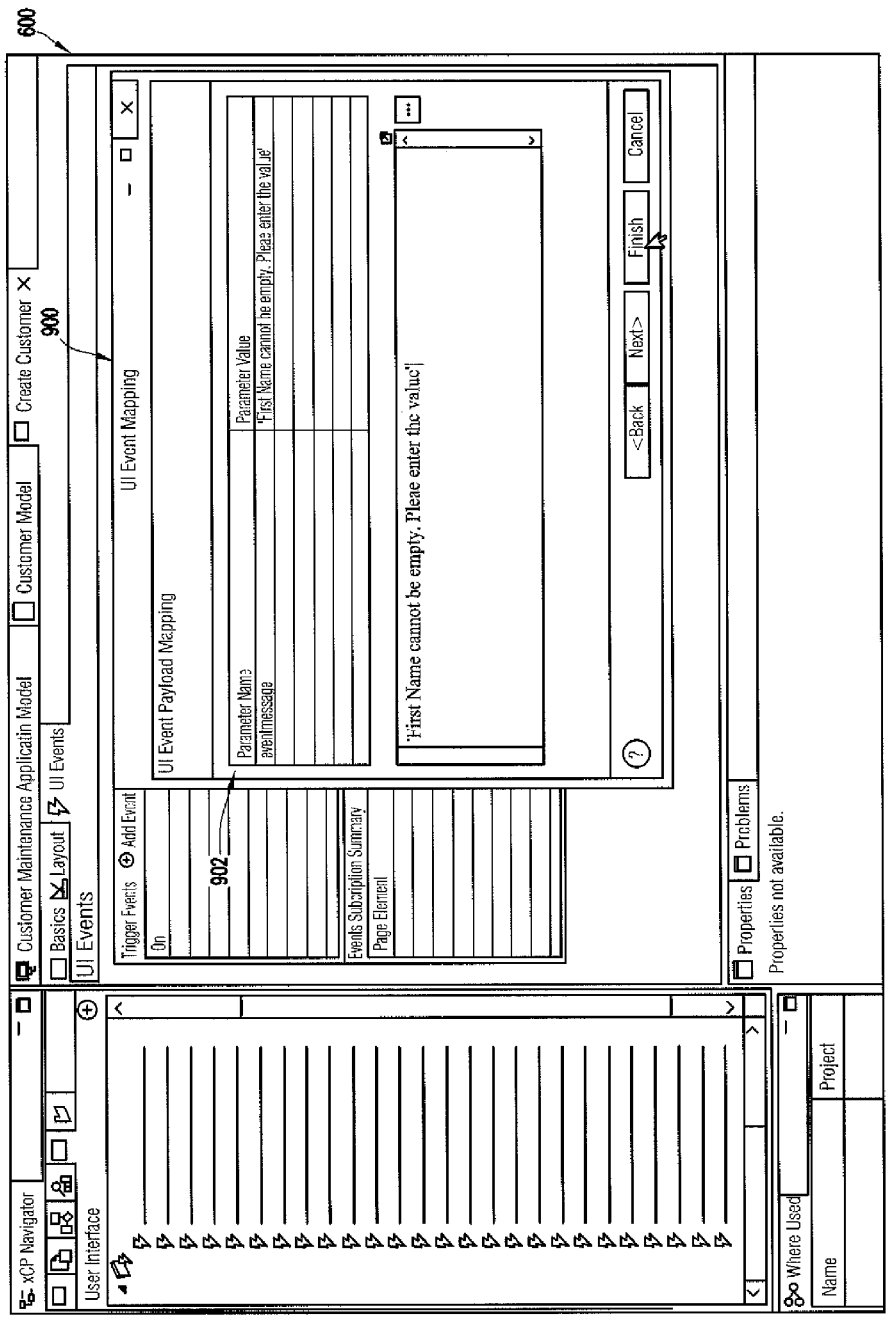

Continuing with the creating of the trigger event definition, FIG. 9 shows the user interface (600) with a subsequent dialog box (900) for continuing the creation of the trigger event definition initiated in FIG. 8. Although FIG. 8 and FIG. 9 show different dialog boxes that may be displayed for the same creation of a trigger event definition, the dialog boxes may be combined. Alternatively, rather than using dialog boxes, other user interfaces may be used without departing from the scope of the technology.

In the subsequent dialog box (900), the developer may enter parameter values for each parameter definition (not shown above) defined for the UI event definition. In the example, the parameter definition is an event message that takes a String value. Thus, as shown in FIG. 9, the developer specifies that the event message is "First name cannot be empty. Please enter the value" (902). In other words, the developer has defined an event message that matches the validation condition. In one or more embodiments of the technology, all event subscribers created in the trigger event definition use the same validation condition and the same event message.

Figure 10:
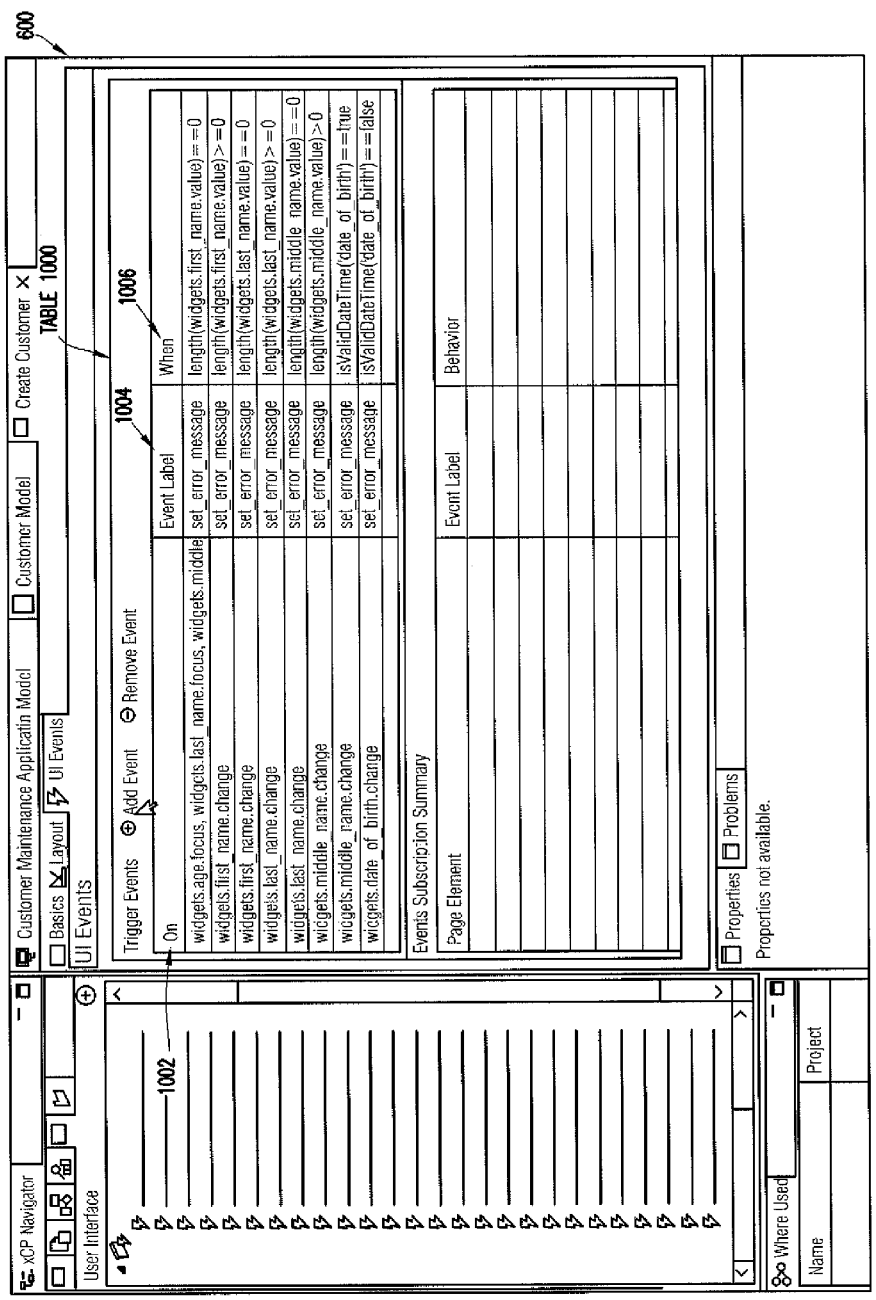

Continuing with the example, the developer may continue to create multiple trigger event definitions. FIG. 10 shows the user interface (600) for the developer with a table (1000) having multiple trigger event definitions. Each row of the table (1000) is a distinct and individual trigger event definition. The first column (1002) of the table (1000) shows the event subscribers specified in the corresponding trigger event definition. The second column (1004) shows the UI event definition that is extended by the trigger event definition. The third column (1006) shows the validation condition that is specified by the trigger event definition. The table (1000) may include additional or fewer columns without departing from the scope of the technology. Further, other interfaces for presenting information to the user may be performed without departing from the scope of the technology.

Figure 11:
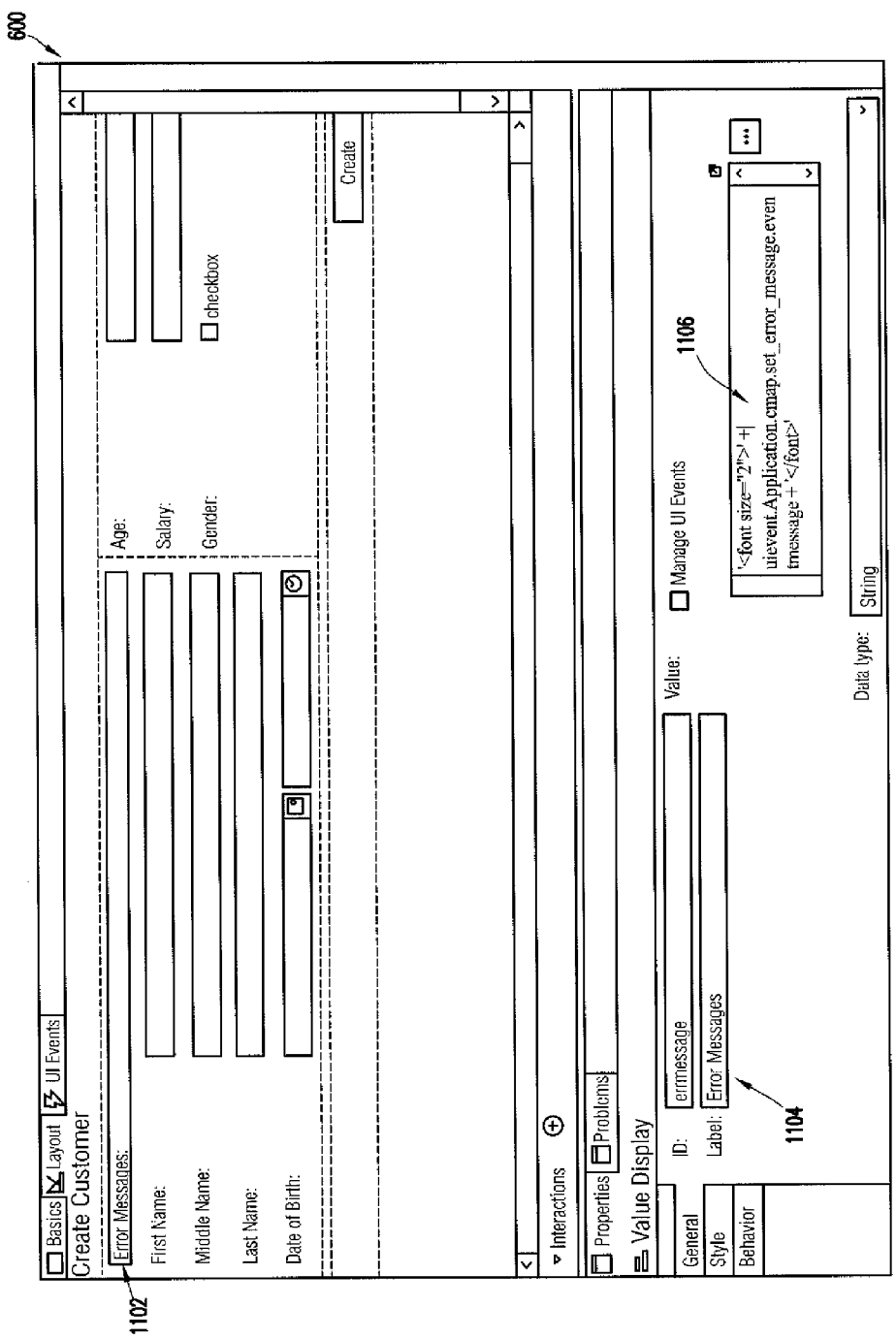
Figure 12:
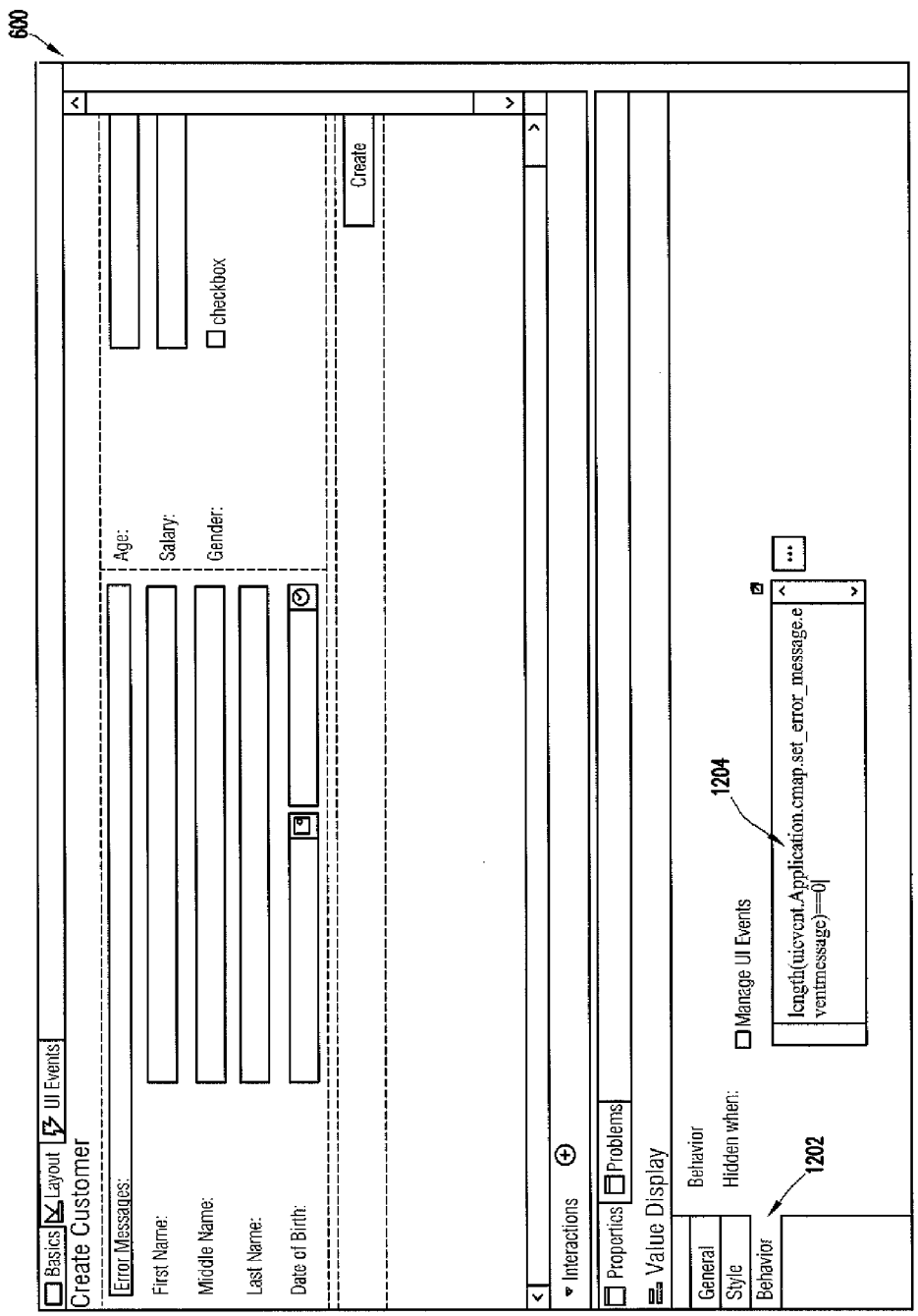

Continuing with the example, FIG. 11 shows the example user interface (600) for the developer to specify a location (1102) for the error message that is defined by the parameter value for each trigger event definition. As shown, in the example, the developer specifies the location to be at the top of the create customer page. In particular, the developer adds a field with label "error messages" (1104) that is displayed on the page at the location (1102). Also, the developer adds an expression (1106), which defines that the message is to be presented from the trigger event definitions that extend the error message event definition. In FIG. 12, in the example user interface (600), the developer may select the behavior tab (1202) and add an expression (1204) that the error message field is hidden when no error message exists.

Once the developer has created the web application with UI event definitions and trigger event definitions, an end user may use the web application. During runtime when used by the end user, the page with the instructions for the error message field processes each trigger event definition upon a UI event. If a trigger event definition applies and has a satisfied condition, the page displays the error message. If a trigger event definition does not apply and does not have a matching condition, the next trigger event definition is accessed until all trigger event definitions are processed or an error message is displayed. Thus, because trigger event definitions are processed in order, a chain of validation may be created, whereby, for the same UI event, multiple validation conditions are checked in order to determine whether any of the validation conditions are satisfied indicating a presence of an error.

FIGS. 13.1-13.3 shows an example create customer page (1300) for the end user in accordance with one or more embodiments of the technology created by the developer in FIGS. 6-12. Turning to FIG. 13.1, the user initially selects the last name field (1302) in the create customer page (1300). The selection of the last name field (1302) is a UI event that is a focus on the last name field. In response, the event subscriber for the last name field focus is identified. The event subscriber was specified in the dialog box shown above in FIGS. 8 and 9. Because the first name field (1304) is empty, message (1306) is displayed informing the end user that the first name cannot be empty.

Continuing with the above example, in FIG. 13.2, the end user enters the first name in the first name field (1304) and moves the focus to the last name field (1302) to start entering the last name. Focusing on the last name field is again a UI event, which causes another subscriber to be identified and a message (1308) is displayed that informs the user that the last name cannot be empty.

Continuing with the above example, in FIG. 13.3 the create customer page (1300) that is displayed immediately when a user starts typing in the last name field. In particular, editing the last name field is again a UI event, which causes another event subscriber to be identified based on editing the last name field (1302). The identified event subscriber is associated with a validation condition to test whether the middle name field (1310) is empty. Because the middle name field is empty, a message (1312) is displayed that informs the user that the middle name cannot be empty.

As shown in the example, one or more embodiments of the technology provide a publish subscribe model for event based validation. Further, the developer may link validation and easily define multiple validation tests to perform based on UI events in different portions of the page.

Figure 14:
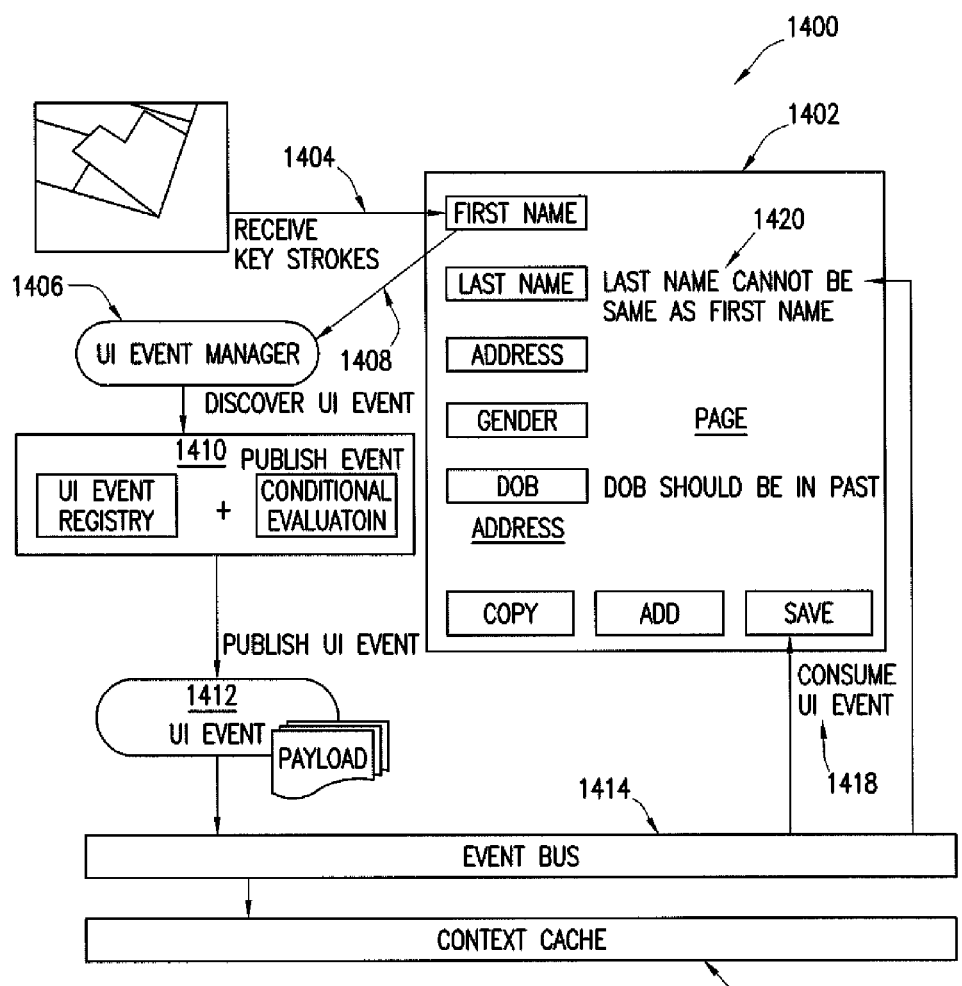

FIG. 14 shows an example runtime environment processing (1400) in accordance with one or more embodiments of the technology. FIG. 14 is an example of the runtime environment shown in FIG. 3. In the example, page (1402) receives keystroke (1404) from a keyboard. The UI event manager (1406) detects the received keystroke (1408) and creates a published event (1410) with a reference to a UI event registry and information for conditional evaluation. The published UI event (1412) is transmitted to the event bus (1414) and consumed. The event bus (1414) may access the context cache (1416) and consume (1418) the UI event. In other words, the event bus (1414) tests event subscribers for the particular type of UI event. Because of the validation condition of an event subscriber being identified, an error message (1420) is displayed to the end user.

Figure 15:
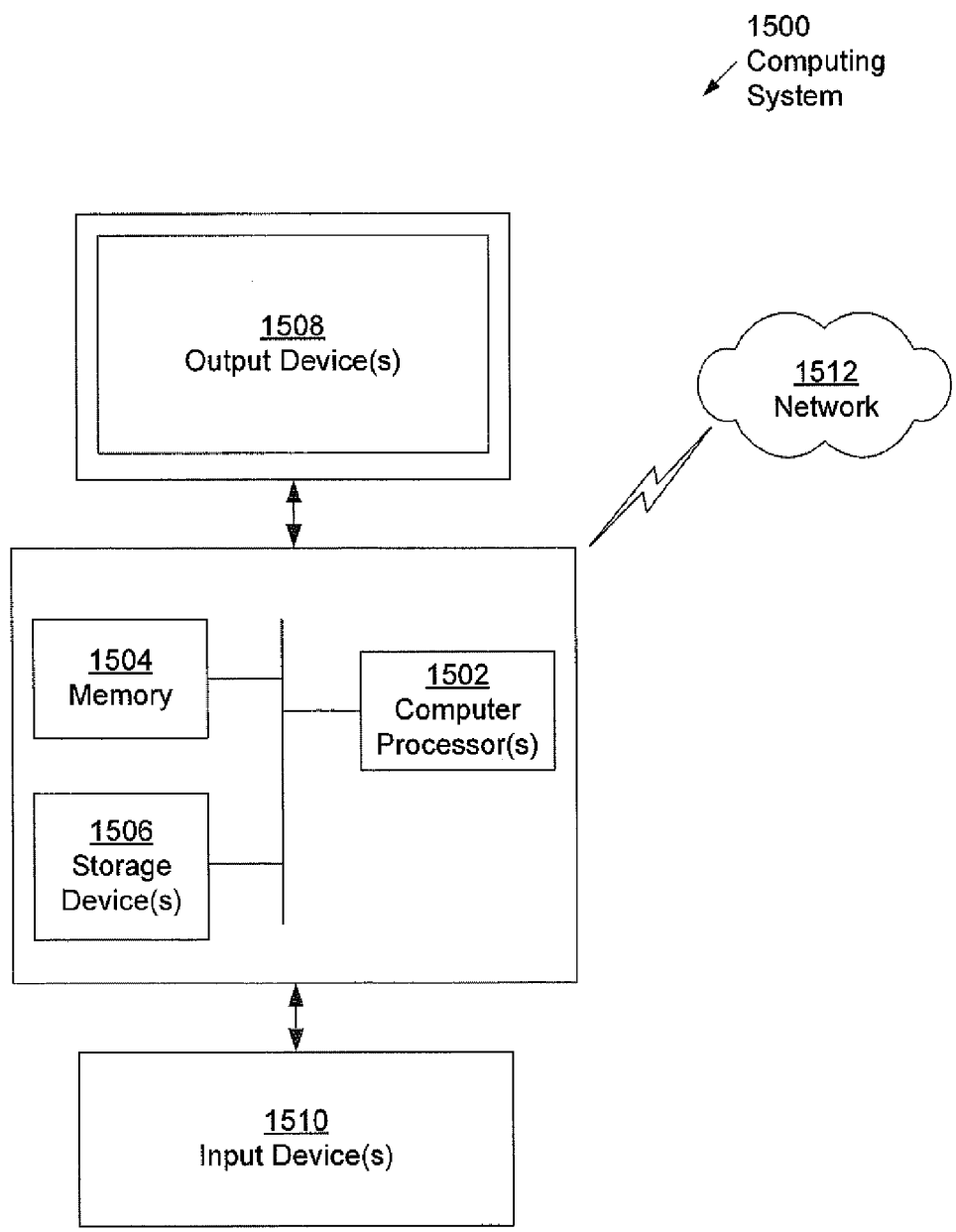
FIG. 15 shows a computing system in accordance with one or more embodiments of the technology.

Embodiments of the technology may be implemented on a computing system. Any combination of mobile, desktop, server, embedded, or other types of hardware may be used. For example, as shown in FIG. 15, the computing system (1500) may include one or more computer processor(s) (1502), associated memory (1504) (e.g., random access memory (RAM), cache memory, flash memory, etc.), one or more storage device(s) (1506) (e.g., a hard disk, an optical drive such as a compact disk (CD) drive or digital versatile disk (DVD) drive, a flash memory stick, etc.), and numerous other elements and functionalities. The computer processor(s) (1502) may be an integrated circuit for processing instructions. For example, the computer processor(s) may be one or more cores, or micro-cores of a processor. The computing system (1500) may also include one or more input device(s) (1510), such as a touchscreen, keyboard, mouse, microphone, touchpad, electronic pen, or any other type of input device. Further, the computing system (1500) may include one or more output device(s) (1508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1500) may be connected to a network (1512) (e.g., a local area network (LAN), a wide area network (WAN) such as the Internet, mobile network, or any other type of network) via a network interface connection (not shown). The input and output device(s) may be locally or remotely (e.g., via the network (1512)) connected to the computer processor(s) (1502), memory (1504), and storage device(s) (1506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (1500) may be located at a remote location and connected to the other elements over a network (1512). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A non-transitory computer readable medium comprising computer readable program code for performing event based validation, the performing comprising:
    obtaining, for a first user interface (UI) event, a first UI event definition comprising a first parameter definition and a second parameter definition;
    obtaining, for the first UI event definition, a first trigger event definition and a second trigger event definition, wherein the first trigger event definition associates a first event subscriber to the first UI event with a first validation condition and a first parameter value for the first parameter definition, wherein the second trigger event definition associates a second event subscriber to the first UI event with a second validation condition and a second parameter value for the second parameter definition;
    associating a first page of a web application with the first UI event definition by adding the first UI event to the first page;
    detecting, through a first action performed by the end user, the first UI event in the first page of the web application;
    transmitting the first UI event to an event bus;
    identifying, by the event bus and based on a first type of the first UI event, the first event subscriber and the second event subscriber, wherein the first type of the first UI event specifies the first action and a first item affected by the first action;
    making a first determination, based on testing the first validation condition and data in a context cache, that the first validation condition is satisfied, wherein the data in the context cache comprises data that the end user of the web application input on a second page of the web application;
    performing, based on the first determination, a second action in the first page of the web application by applying the first parameter value to the first parameter definition; and
    making a second determination, based on testing the second validation condition, that the second validation condition is not satisfied.

2. The non-transitory computer readable medium of claim 1, wherein the first UI event is in a first portion of the first page and wherein the first validation condition of the first event subscriber is a test on data from an external source.

3. The non-transitory computer readable medium of claim 1, wherein the second action comprises displaying a message specified by the first event subscriber in the first page.

4. The non-transitory computer readable medium of claim 1, wherein the performance of the second action comprises performing a second UI event, and wherein the event based validation further comprises:
    obtaining, for the second UI event, a second UI event definition comprising a third parameter definition;
    obtaining, for the second UI event definition, a third trigger event definition that associates a third event subscriber to the second UI event with a third validation condition and a third parameter value for the third parameter definition;
    associating the first page of the web application with the second UI event by adding the second UI event to the first page;
    detecting, through a third action performed by the end user, the second UI event in the first page of the web application;
    transmitting the second UI event to the event bus;

identifying, by the event bus and based on a second type of the second UI event, the third event subscriber to the second UI event, wherein the second type of the second UI event specifies the third action and a second item affected by the third action;

making a third determination, based on testing the third validation condition, that the third validation condition is satisfied; and performing, based on the third determination, a fourth action in the first page of the web application by applying the third parameter value to the third parameter definition.

5. The non-transitory computer readable medium of claim 1, wherein the first determination and the second determination are performed in parallel.

6. A system performing event-based validation, comprising:

a computer processor;

a builder that, when executed on the computer:
  obtains, for a first UI event, a first UI event definition comprising a first parameter definition and a second parameter definition;
  obtains, for the first UI event definition, a first trigger event definition and a second trigger event definition, wherein the first trigger event definition associates a first event subscriber to the first UI event with a first validation condition and a first parameter value for the first parameter definition, wherein the second trigger event definition associates a second event subscriber to the first UI event with a second validation condition and a second parameter value for the second parameter definition;
  associates a first page of a web application with the first UI event definition by adding the first UI event to the first page;

an UI event manager that, when executed on the computer processor:
  detects, through a first action performed by the end user, the first UI event in the first page of the web application, and
  transmits the first UI event to an event bus, the event bus operatively connected to the UI event manager and configured to:
  receive the first UI event;
  identify, based on a first type of the first UI event, the first event subscriber and the second event subscriber, wherein the first type of the first UI event specifies the first action and a first item affected by the first action;
  make a first determination, based on testing the first validation condition and data in a context cache, that the first validation condition is satisfied, wherein the data in the context cache comprises data that the end user of the web application input on a second page of the web application;
  perform, based on the first determination, a second action in the first page of the web application by applying the first parameter value to the first parameter definition; and
  make a second determination, based on testing the second validation condition, that the second validation condition is not satisfied.

7. The system of claim 6, wherein the first UI event is in a first portion of the first page and wherein the first validation condition is a test on-data from an external source.

8. The system of claim 6, wherein the second action comprises displaying a message specified by the first event subscriber in the first page.

9. The system of claim 6, wherein the performance of the second action comprises performing a second UI event, wherein the builder, when executed on the computer processor, further:
  obtains, for the second UI event, a second UI event definition comprising a third parameter definition;
  obtains, for the second UI event definition, a third trigger event definition that associates a third event subscriber to the second UI event with a third validation condition and a third parameter value for the third parameter definition;
  associates the first page of the web application with the second UI event by adding the second UI event to the first page,
wherein the UI event manager, when executed on the computer processor, further:
  detects, through a third action performed by the end user, the second UI event in the first page of the web application; and
  transmits the second UI event to the event bus,
wherein the event bus is further configured to:
  receive the second UI event;
  identify, based on a second type of the second UI event, a third event subscriber to the second UI event, wherein the second type of the second UI event specifies the third action and a second item affected by the third action;
  make a third determination, based on testing the third validation condition, that the third validation condition is satisfied; and
  perform, based on the third determination, a fourth action in the first page of the web application by applying the third parameter value to the third parameter definition.

10. The system of claim 6, wherein the first determination and the second determination are performed in parallel.

* * * * *